D. HERMAN.
Bee Hive.
No. 51,315.                        Patented Dec. 5, 1865.
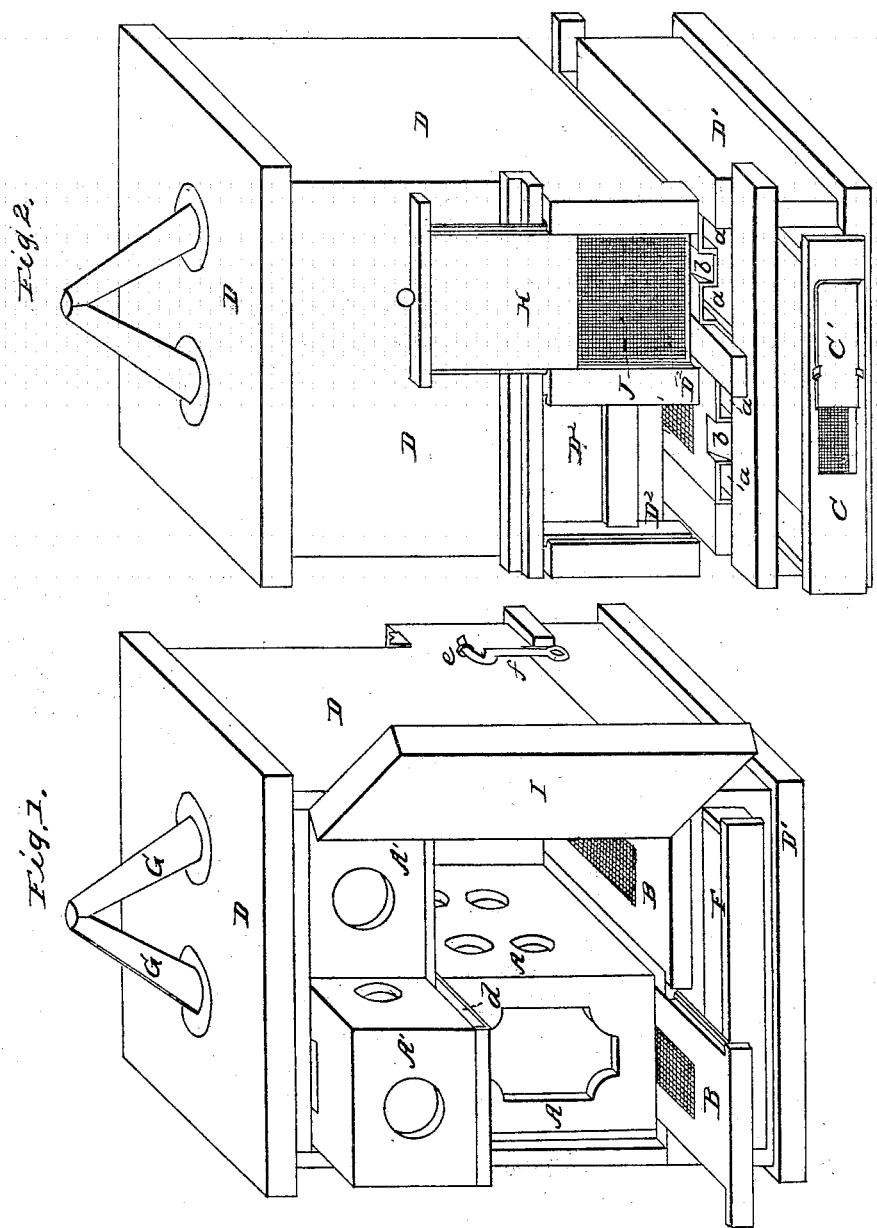

UNITED STATES PATENT OFFICE.

DAVID HERMAN, OF BIGLER P. O., PENNSYLVANIA.

IMPROVEMENT IN BEE-HIVES.

Specification forming part of Letters Patent No. 51,315, dated December 5, 1865.

*To all whom it may concern:*

Be it known that I, DAVID HERMAN, of Bigler P. O., Adams county, in the State of Pennsylvania, have invented certain new and useful Improvements in Bee-Hives; and I do hereby declare that the following is a full and exact description thereof, reference being had to the accompanying drawings, and to the letters of reference thereon marked.

Figure 1 is a perspective view of the rear of the hive. Fig. 2 is a perspective view of the front of the hive, the base being dropped down to show the interior.

To enable those skilled in the art to make and use my invention, I will describe its construction and operation.

In Fig. 1, A are the lower drawers or boxes to keep the bees in, and in each of which is a glass window. The bees live and breed in these boxes. A' are the honey boxes or drawers, in which is deposited the surplus honey, and from which it is taken for table use; B, the movable slides below the boxes A, and which can be removed independently of the said boxes. In these slides are perforated or gauze-wire panes, upon which the dirt and dead bees fall down from the boxes A; D, the top of the hive and outer case; D', the bottom or base of the hive; F, the lower drawer for feeding the bees in, which the bees enter by withdrawing slides B B; G, the ventilating-tubes; I, the door; C, the robber box or drawer, into which are decoyed all the enemies of the bee.

C' is a slide, to be removed, so that light will shine through the glass or perforated pane and light up the inside of the robber-box, so as to attract all insects or marauding bees which attack the hive; *a a a a*, apertures of decoy, leading from the sun-boxes $D^2$ directly into the robber or decoy box C; *b b*, apertures for admitting the bees into the hive or bee-boxes A from the sun-boxes $D^2$; $D^2$, the sun-boxes, where the bees enter. (See Fig. 2.)

H are the slides to the sun-boxes, which have a double entrance; J, the gauze slides for admitting air and sun to the hive. These slides of gauze or perforated metal can be used in the winter for admitting the sunlight into the hive and in the summer for ventilation. I use the board slide sufficiently raised for the passage of the bees.

It will be seen that all of the boxes A' A' communicate with each other, so that the bees have free access to any or all of them.

The slide *d*, of tin, is used to cut off communication of the bees with the honey-boxes A' when they are filled and I wish to remove the honey.

In the operation of my invention it will be seen that, for convenience, my hive is constructed of two parts—a base, D', and a top, D. These parts are connected by hooks *e* and eyes *f*. The bees enter the hive at *b b* from the sun-boxes $D^2$, and pass into the bee-boxes A and up into the honey-box A' to deposit the honey for table use.

As the moth or other insects approach the bee-entrance they will be attracted by the light in the robber-box C, into which they will enter and deposit their eggs, instead of in the hive. Whenever desired, the robber-box can be removed, and the eggs and insects found in it can be destroyed. When this box is not used as a decoy the slide C' can be closed and the box be darkened.

The ventilators G on the top of the hive are intended to admit the air to the hive, so that at all times there may be free ventilation through the entire hive, thus making a cheap, complete, and convenient hive, and satisfactory in its construction and operation.

Having thus fully described my invention, what I claim as new, and desire to secure by Letters Patent, is—

1. The sun-boxes $D^2$ $D^2$, with slides H and gauze slides J, in combination with the double entrance *a* and *b*.

2. The construction and arrangement of the boxes A A', feed-box F, and slides *d* and B B, as described.

DAVID HERMAN.

Witnesses:
V. C. CLAYTON,
JO C. CLAYTON.